Sept. 1, 1953 J. V. DAVIS 2,650,600
PUSHER TYPE AUTOMATIC PLATING APPARATUS
Filed June 18, 1947 7 Sheets-Sheet 2
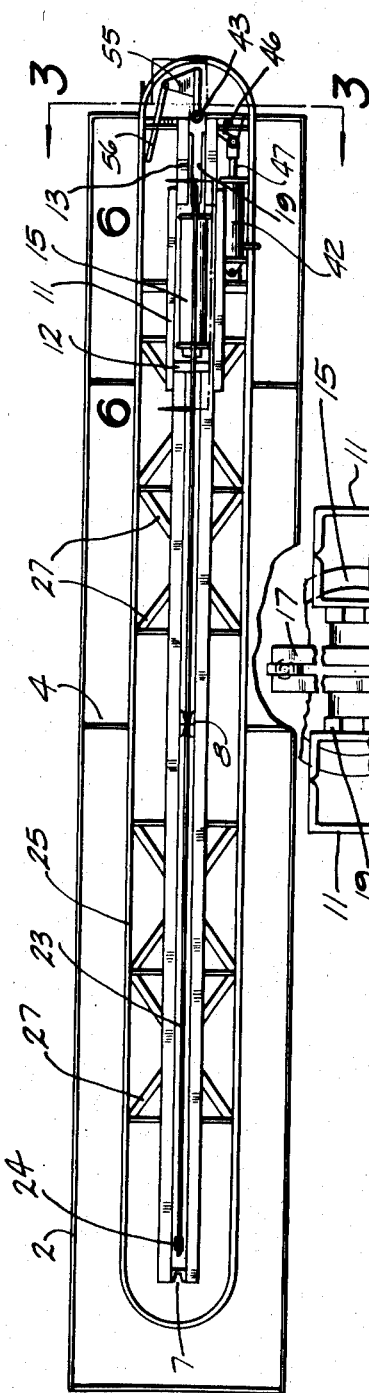
INVENTOR.
JOHN V. DAVIS
BY
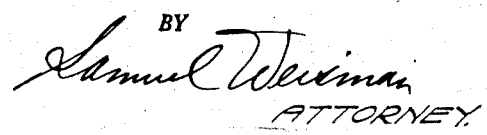
ATTORNEY.

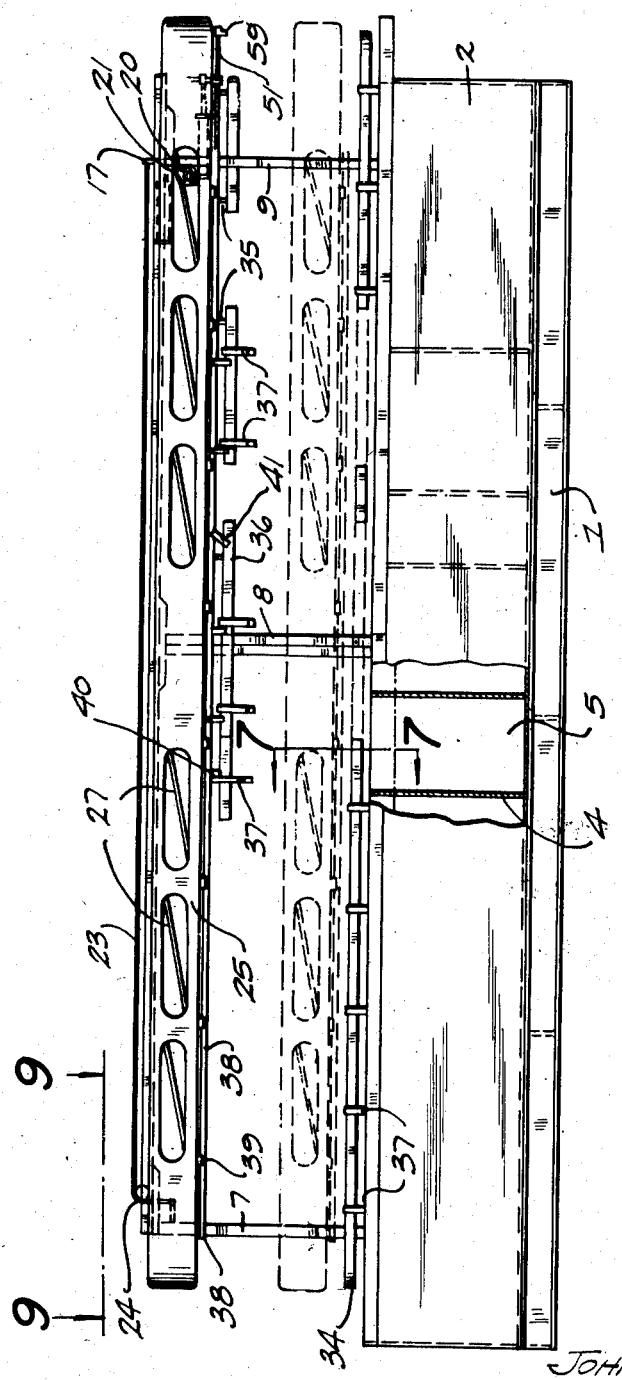

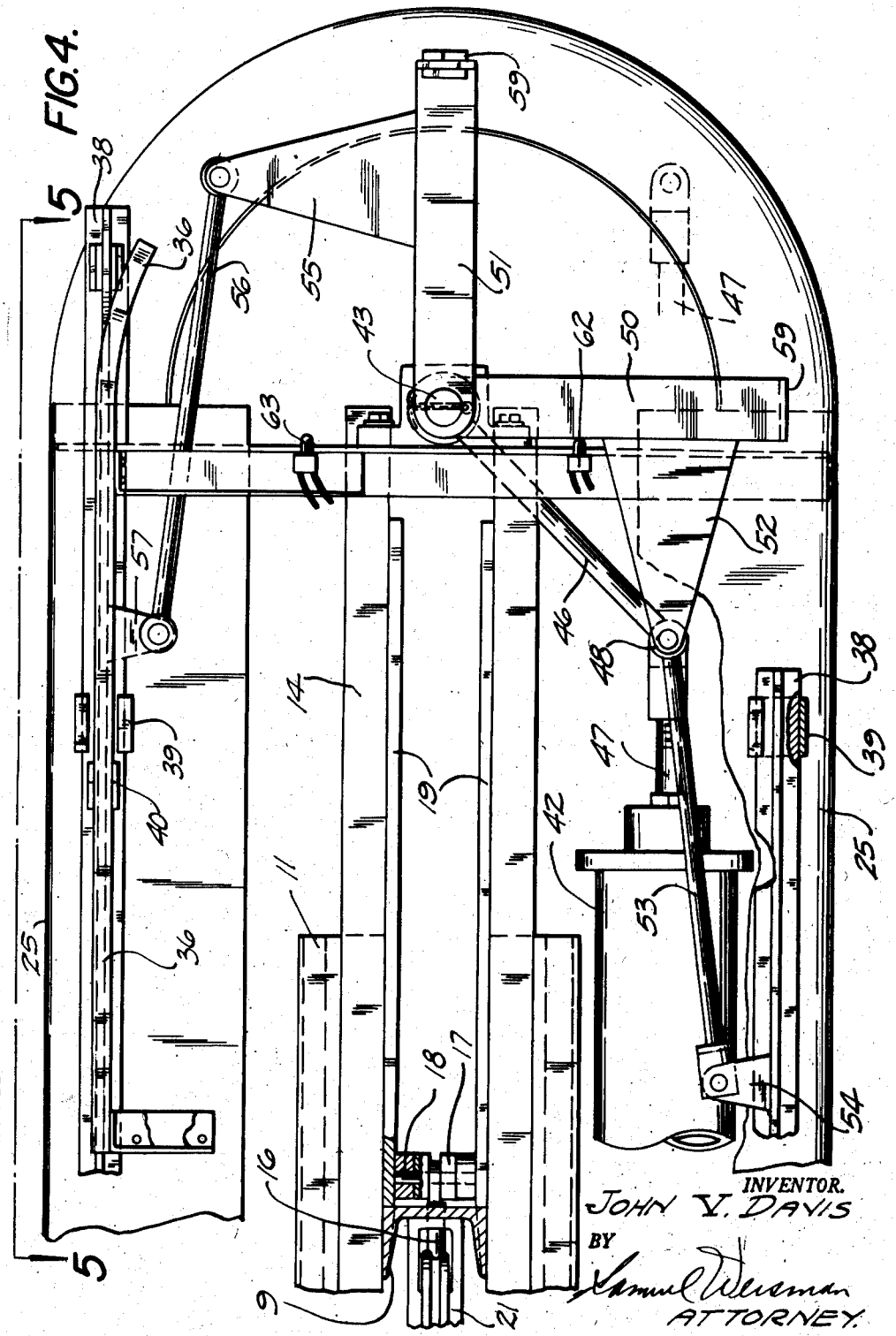

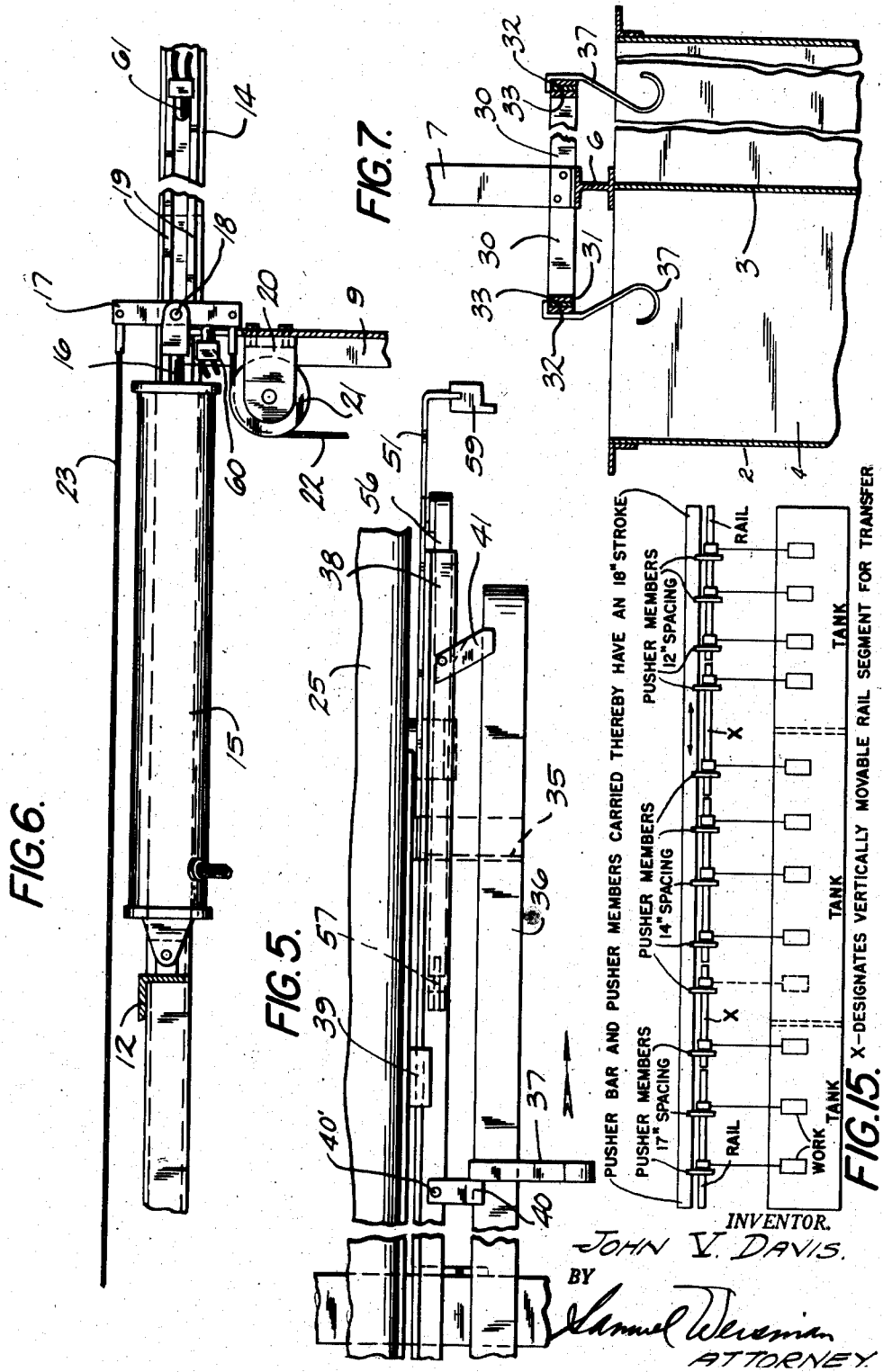

Sept. 1, 1953. J. V. DAVIS 2,650,600
PUSHER TYPE AUTOMATIC PLATING APPARATUS
Filed June 18, 1947 7 Sheets-Sheet 5

INVENTOR.
JOHN V. DAVIS.
BY
Samuel Weisman
ATTORNEY.

Sept. 1, 1953 J. V. DAVIS 2,650,600
PUSHER TYPE AUTOMATIC PLATING APPARATUS
Filed June 18, 1947 7 Sheets-Sheet 6

INVENTOR.
JOHN V. DAVIS.
BY
*Samuel Weisman*
ATTORNEY.

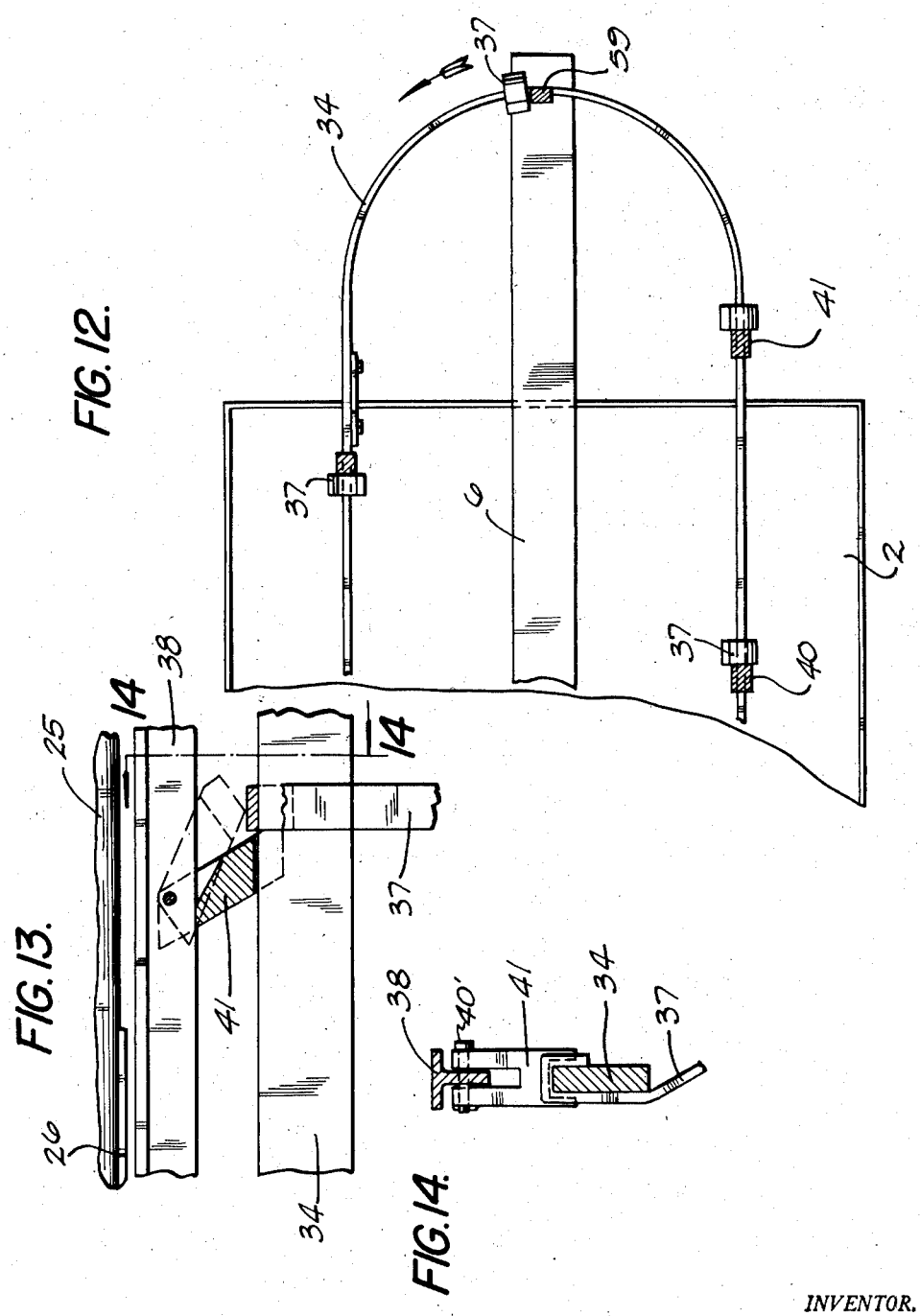

Patented Sept. 1, 1953

2,650,600

UNITED STATES PATENT OFFICE 2,650,600

PUSHER TYPE AUTOMATIC PLATING APPARATUS

John V. Davis, Detroit, Mich., assignor to The Udylite Corporation, Detroit, Mich., a corporation of Delaware Application June 18, 1947, Serial No. 755,365

16 Claims. (Cl. 134—77)

The present invention pertains to a novel apparatus for conveying work through a succession of tanks or receptacles in an electroplating operation and also for lifting the work in order that it may be transferred over the partitions that separate the receptacles from one another.

The problem of lifting the work in order that it may be transferred over the partitions has resulted in numerous complicated, expensive and awkward mechanisms. One of the objects of this invention is to provide a comparatively simple mechanism for this purpose. In this respect the work-carrying rail consists of spaced sections mounted fixedly over the tanks and intervening sections carried by a vertically movable chassis. Oscillating pusher bars for propelling the work on the rail are carried by the chassis. The operation of the apparatus is timed so that the work is on the movable sections when ready for transfer. The chassis then rises, carrying with it the movable sections and the pusher bars, and the bars advance the work when the chassis is in its upper position. The chassis then descends to bring the movable sections in line with the fixed sections, and the pusher bars are again actuated to advance the work in the receptacles.

A continuous plating apparatus often comprises two mutually adjacent rows of receptacles and a curved connecting rail section at one or both ends. The work pieces on the curved rail section converge toward the center of the curve and consequently have a tendency to crowd or engage one another with detrimental results. This difficulty can be avoided by increasing the spacing of the work on the curved rail section, and another object of the invention is to provide a simple apparatus for this purpose.

A shaft is rotatably mounted in the center of the curved rail section and carries a pair of arms which in turn carry pushers operative on this section. The arms are angularly spaced apart half the extent of the curve, so that two movements of the shaft are necessary to pass the work over the entire curve. The shaft is oscillated by a link connected to the means for reciprocating the pusher bars, and the free end of the link has the same linear displacement as the pusher bars. The aforementioned arms operating on the curved rail section have approximately the length of the link, or are slightly longer. As a result, the linear displacement of the arcuately moving pushers on the arms is greater than the pushers on the pusher bars, so that the work pieces are spaced farther apart on the curved rail section than on the straight portions thereof. The difference is sufficient to avoid the aforementioned crowding.

The invention is fully disclosed by way of example in the following description and in the accompanying drawings in which:

Figure 1 is an elevation of the device with the chassis in raised position;

Figure 2 is a top plan view of the device;

Figure 3 is a section on the line 3—3 of Figure 2;

Figure 4 is a bottom plan view on the line 4—4 of Figure 3;

Figure 5 is a detail side elevation on the line 5—5 of Figure 4;

Figure 6 is a section on the line 6—6 of Figure 2;

Figure 7 is a section on the line 7—7 of Figure 1;

Figure 12 is a section on the line 12—12 of Figure 8;

Figure 13 is a detail section in a plane parallel to that of Figure 5;

Figure 14 is a section on the line 14—14 of Figure 13, and

Figure 15 is a diagram illustrating unequal spacing of pusher members at different lengths of the pusher bar.

Reference to these views will now be made by use of like characters which are employed to designate corresponding parts throughout.

Figure 8:
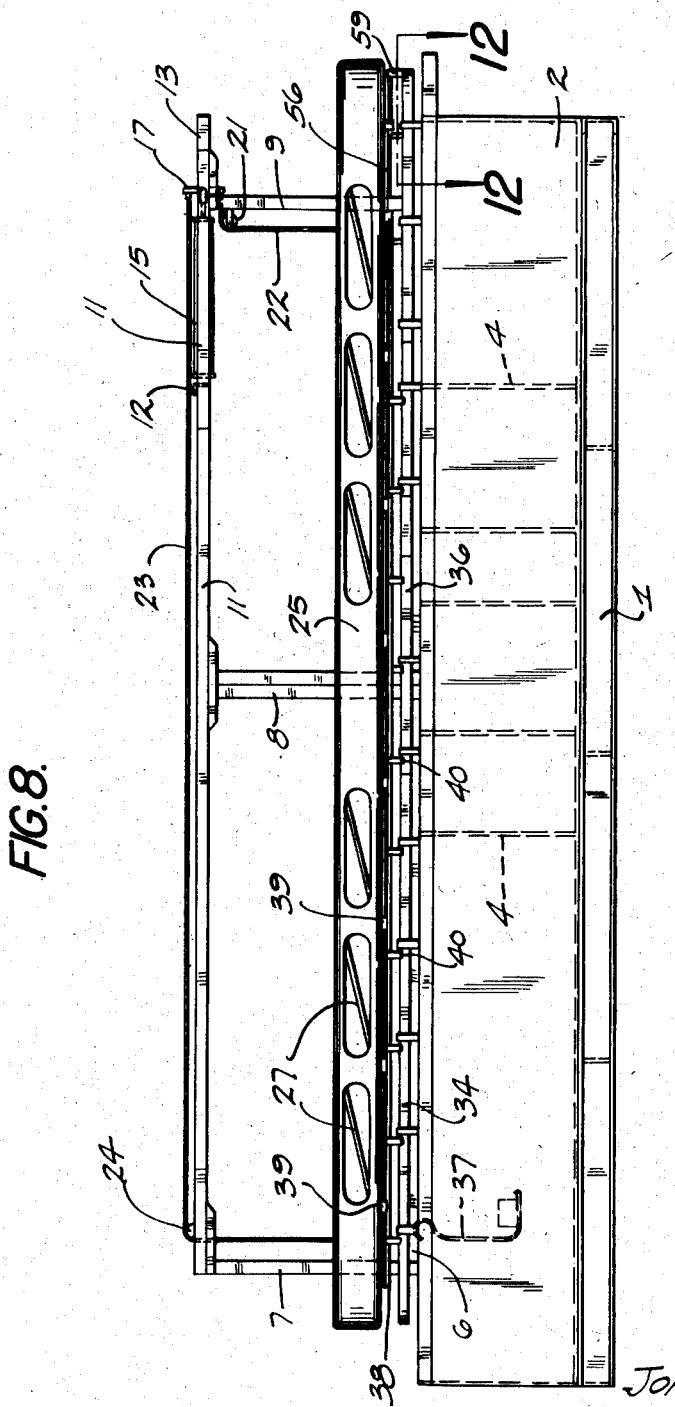
Figure 8 is a side elevation of the device with the chassis in the lower position.
Figure 11:
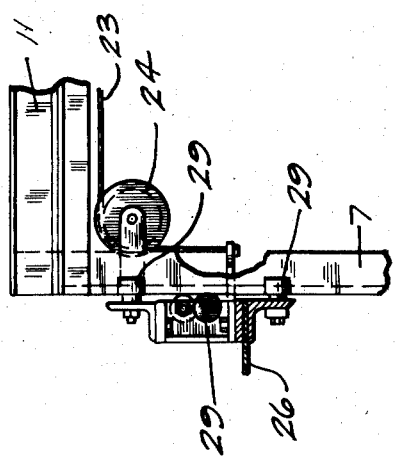
Figure 11 is a section on the line 11—11 of Figure 10.
Figure 9:
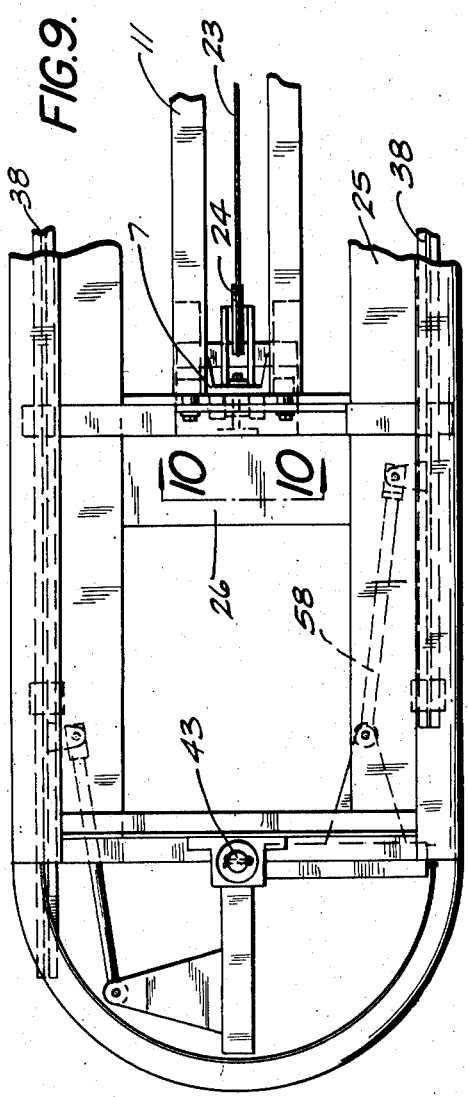
Figure 9 is a detail top plan view on the line 9—9 of Figure 1.
Figure 10:
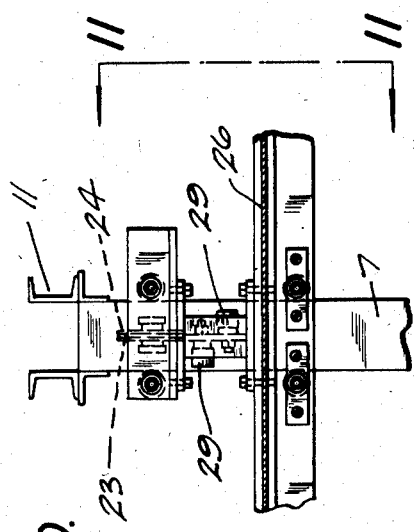
Figure 10 is a section on the line 10—10 of Figure 9.

The machine is built upon a suitable base 1 on which is erected an elongated tank structure 2 consisting preferably of metal plate. The structure is divided by a longitudinal partition 3 and again by a number of suitably spaced partitions 4 forming two parallel rows of compartments 5. Upon the partition 3 is secured a longitudinal I-beam 6 (Figure 7) to support a superstructure as will presently be shown. At the ends and at the center of the beam 6 are mounted vertical columns 7, 8 and 9, as shown in Figure 1. To the upper ends of the columns are secured angle irons 10 on which are mounted horizontal connecting box beams 11, thereby bracing the columns for the load to be carried by them. The beams 11 terminate somewhat short of the end column 9 and have their ends joined by a bracket 12 for a purpose that will presently be described. The members 11 are extended somewhat beyond the column 9 by beams 13 secured to the outer edges thereof, and the latter are further extended horizontally in the same direction by channels 14 secured to their inner surfaces and also to the column 9. The bracket 12 serves for the pivotal attachment of the closed end of a fluid cylinder 15 that extends approximately to the column 9. The piston rod 16 extending through this end of the cylinder carries a crosshead 17 pivotally attached thereto by a horizontal pin 18. The ends of the latter ride between spaced horizontal guide rails 19 fastened on the mutually facing surfaces of the respective channels 14. A bracket 20 is mounted on the upper end of the column 9 and carries a sheave 21. Cables 22 and 23 are fastened to the ends of the crosshead 17. The cable 22 passes over the sheave 21, and the cable 23 is passed over a pulley 24 mounted at the opposite end of the beam structure 11.

The cables 22 and 23 suspend a vertically movable structure comprising an enclosing wall 25 substantially as long as the series of tanks and about as wide. The wall 25 carries a floor consisting of open plates 26 and is suitably braced by cross bars 27. Suitable roller frames 28 are mounted on the floor and carry rollers 29 riding on the vertical columns to guide the structure in its up and down movement.

Transverse supporting bars 30 are secured across the beam 6 and have plates 31 secured across their ends for supporting fixed and spaced rail sections 32, with insulation 33 inserted between the parts 31 and 32. The sections 32 are alined along both rows of compartments, and included in the fixed rail construction is a semicircular connecting piece 34 at each end of the apparatus. The tank structure is open at one end to constitute a loading and unloading station. One of the compartments at this end may be open and constitute a drying station on the outcoming side of the curved section. If the compartment at the incoming side of the curved section is closed, the work is lifted over its end wall in the same manner that it is lifted over the several partitions, as will presently be described. Brackets 35 (Figures 3 and 5) on the bottom of the chassis 25, 26 carry movable rail sections 36 adapted to enter and fill the spaces between the fixed sections 32 to form a continuous work-carrying rail when the chassis is lowered. Current is supplied to the continuous rail in any manner well known in the art, and work carriers 37 are suspended from the several rail sections in any approved manner. A pair of pusher bars 38 (Figures 4 and 5) of T-section are mounted in shoes 39 carried by the bottom of the chassis. The pusher bars 38 correspond respectively to the two alined series of rail sections and lie above the sections 32. Fixed pushers 40 and pivoted pushers 41 (Figure 5) are carried by the bars 38 and are adapted to operate on the work carriers. The pushers 41 are constructed to pivot only on being retracted and are provided wherever a pusher must travel across a work carrier in being retracted. A suitable stop incorporated in each such pusher and adapted to engage the pusher bar on the pushing movement will hold the pusher from pivoting at this time. Both sets of pushers are adjustable lengthwise on their supporting bars 38 by positioning their supporting pins 40' shown in Figure 5.

The pusher bars are actuated from a drive or pusher cylinder 42 mounted on the chassis 25, 26 adjacent to and longitudinally of one of the bars. At each end of the chassis is mounted a vertical shaft 43 concentrically with the adjacent curved rail section and passing through the bottom of the chassis. Each shaft is held in suitable bearings 44 attached to partitions 45 carried by the chassis. The shaft 43 nearer the cylinder 42 has a link 46 secured to and pivotally connected to the exposed end of the piston rod 47 by a suitable swivel 48. The partition 45 carrying the bearings 44 is formed with an opening 49 to permit passage of the link 46 and piston rod 47 therethrough. In other respects the assembly at both ends of the rail is alike, and only one assembly need be described in detail.

Beneath the bottom of the chassis the shaft 43 carries a pair of fixed arms 50, 51 at a right angle to each other. From the arm 50 a lug 52 extends toward the cylinder 42 and is joined by a link 53 to an ear 54 on the adjacent pusher bar, the link having its ends swiveled to the parts 52 and 54. The forward stroke of the piston rod 47 is such as to swing the link 46 and turn the shaft 43 through an angle of 90° to the dotted line position shown in Figure 4. The arm 50 turns with the shaft and pulls the adjacent pusher bar 38 by means of the parts 52, 53. A lug 55 extending from the arm 51 is joined by a link 56 to an ear 57 extending from the other pusher bar 38, so that the aforementioned motion of the shaft 43 slides the last named bar 38 simultaneously in the direction opposite to that of the other bar 38. At the other end of the apparatus, the bar 38 nearer the cylinder 42 is connected to the arm 50 by a link 58. The free ends of the arms 50, 51 carry pushers 59 that propel the work 90° on the end sections 34 on each 90° movement of the shaft 43 when the chassis is in the lower position. The closed end of the cylinder 42 is pivotally mounted to accommodate the arcuate movement of the swivel 48.

The superstructure carries limit switches 60 and 61 at opposite sides of the cross head 17 and engageable thereby for a timed control of the lifting cylinder 15 and the drive cylinder 42 in a sequence presently to be described. For the same purpose the partition 45 carries limit switches 62 and 63 engageable by the arms 50 and 51 at the ends of their respective movements.

The timed cycle of operation is as follows: Let it be assumed that the chassis is in the lowered position and the pushers are behind the respective work carriers. At this time the pushers are spaced about two inches behind the carriers, having been retracted to this position to avoid clashing with the carriers on the previous downward movement of the chassis. The cylinder 42 then operates to advance the link 46 90° to the position shown in Figure 4, thereby advancing all the carriers. The linear travel of the pushers may be, for example, 18" to impart a 16" movement to the carriers on the straight parts of the continuous rail. On engagement of the limit switch 63 by the lug 55, the lifting cylinder 15 is energized to raise the chassis with its movable rail sections 36 and the carriers. The crosshead 16 eventually contacts the switch 61 to arrest the operation of the lifting cylinder and again energize the drive cylinder 42 to retract the pushers to positions behind the carriers on the sections 36. At the end of the retracting movement, the arm 50 engages the switch 62 to advance the piston rod 47 and advance the work on the lifted rail sections 36. The work pieces thereby cross the respective partitions 4 so that each piece will enter the next compartment on the subsequent descent of the chassis. This socalled transfer movement is terminated by the engagement of the switch 63 by the lug 55, whereupon the chassis commences to descend through the operation of the lifting cylinder. The descent is terminated by the engagement of the cross head 17 with the switch 60 whereupon the drive cylinder 42 is operated to retract the pushers to positions behind the work carriers for the beginning of another cycle.

The construction around the shafts 43 is designed to avoid crowding and contacting of the work pieces as they converge toward the shafts in rounding the turns 34. Such crowding would occur if the linear travel on the turns were not greater than on the straight portions of the rails, and the disclosed construction makes the first displacement greater than the second although simultaneous therewith. In a given construction, the lengths of the link 46 and the arms 50, 51 are respectively 11½", 12" and 12". A 90° turn of the shaft 43, from the full to the dotted line position shown in Figure 4, will displace the free end of the link a distance of 16.3", which is the maximum possible spacing between successive work pieces on the straight parts of the rail. The 90° length of curved rail section traversed by the pushers 59 on the same movement of the shaft 43 is 18.5", providing a wider spacing at the work pieces on the curved sections than on the straight portions of the rail.

Unequal travels of selected work pieces may be obtained by unequal spacing of the pushers. For example, if a dipping travel of 1" is desired, this may be accomplished by providing two successive pushers 3" apart over the dipping compartment, allowing for a 2" rearward overlap, as previously indicated.

Likewise, variation of the spacing of the work pieces in various positions of the track may be accomplished by regulating the spacing of the pushers. This applies to the straight portions of the track as well as at the curve. For example, as shown in Figure 15, the stroke of the pushers being uniform throughout the track at 18", a 14" spacing of the work pieces may be desired in certain baths and is obtained by spacing the pushers 14" apart in the corresponding lengths of the track. The overlap or lost motion in this case is 4" on each stroke. Similarly, if another bath favors a 17" spacing of the work pieces, the pushers are here spaced 17" apart. In the rinsing compartments, a spacing of 12" may be sufficient, and in such case the pushers are spaced 12" apart in the corresponding lengths of track, leaving an overlap of 6" in an 18" pusher stroke.

It will be understood that the particular figures given here are merely illustrative.

There is still another advantage in providing unequally spaced or lengthwise adjustable pushers on a reciprocating pusher bar. Many installations are made up of a number of complete and separate tanks laid end to end in abutting relation, rather than by dividing a long tank by partitions as here shown. The separate tanks, although made according to specifications, are not accurately dimensioned. They may vary from ¼ inch to nearly 1 inch in overall length. Also, the end walls may not be perfectly perpendicular to the base. Either of these errors introduces an alteration in the calculated center distance between tanks. Such errors are cumulative and may amount to a few inches for the entire installation. Another practice contributing to the same result is the thickening of the walls of certain tanks, for example, by means of a five inch brick wall for a chromium tank, where accuracy within a small fraction of an inch is not maintained.

The unpredicted variation in the center distance between tanks requires a corresponding adjustment in the position of the pushers. In the case of a unidirectional chain as in applicant's prior Patent No. 2,479,322 of August 16, 1949, the adjustment can be made only in terms of integral lengths of a link. Moreover, since the chain travels over the entire series of tanks any particular adjustment is not localized to any tank or small group of tanks. As a result the adjustment in the spacing of the pushers must be sufficient to compensate for all the assembly errors throughout the system and is therefore of greater magnitude than required only by the magnitude of the errors.

A reciprocating pusher bar on the other hand, is localized and operative on only a small number of tanks. The adjustment of the pushers thereon is specific to the corresponding tanks and need not account for the accumulated errors in the system. The net result is that an accurate local adjustment is obtainable and there is less waste of tank length and working space than in making adjustments of the pushers in a unidirectional chain system as above described.

Although a specific embodiment of the invention has been illustrated and described, it will be understood that various alterations in the details of construction may be made without departing from the scope of the invention as indicated by the appended claims.

What I claim is:

1. In a conveying apparatus, a series of receptacles, an alined series of spaced rail sections fixedly supported over said receptacles, a chassis movably mounted over said receptacles, means for moving said chassis up and down over said receptacles, a series of spaced rail sections carried by said chassis and adapted to fit in the spaces between the first named sections in the lower position of the chassis, slidably mounted pusher bars carried by said chassis, means for reciprocating said bars, lengthwise adjustable pushers carried by said bars in close proximity to the movable rail sections and adapted to engage work on the several rail sections in either position of the chassis, and means for sliding said bars in both positions of the chassis.

2. In a conveying apparatus, a series of receptacles, an alined series of spaced rail sections fixedly supported over said receptacles, a chassis movably mounted over said receptacles, means for moving said chassis up and down over said receptacles, a series of spaced rail sections carried by said chassis and adapted to fit in the spaces between the first named sections in the lower position of the chassis, slidably mounted pusher bars carried by said chassis, pushers carried by said bars in close proximity to the movable rail sections and adapted to engage work on the several rail sections in either position of the chassis, and means for sliding said bars in both positions of the chassis, certain of the said pushers being pivotally mounted to swing over obstructions while moving in the non-pushing direction.

3. In a conveying apparatus, a series of receptacles, an alined series of spaced rail sections fixedly supported over said receptacles, a chassis movably mounted over said receptacles, means for moving said chassis up and down over said receptacles, a series of spaced rail sections carried by said chassis and adapted to fit in the spaces between the first named sections in the lower position of the chassis, slidably mounted pusher bars carried by said chassis, unequally spaced pushers carried by said bars in close proximity to the movable rail sections and adapted to engage work on the several rail sections in either position of the chassis, and means for sliding said bars in both positions of the chassis.

4. The device as set forth in claim 3 further characterized by certain of said pushers being pivotally mounted to swing over obstructions while moving in the non-pushing direction.

5. In a conveying apparatus, two spaced receptacles, straight rail sections over said receptacles, an arcuate section connecting said straight rail sections, pusher bars slidably mounted along said straight sections, pushers extending from said bars toward said straight sections, a shaft rotatably mounted in the center of curvature of said curved section, an arm fixed to said shaft, linkage connecting said arm to one of said bars, means for oscillating said shaft, a pusher on said arm and adapted to extend close to said arcuate section, and a connection from said shaft to the other bar.

6. In a conveying apparatus, two spaced receptacles, straight rail sections over said receptacles, an arcuate section connecting said straight rail sections, pusher bars slidably mounted along said straight sections, pushers extending from said bars toward said straight sections, a shaft rotatably mounted in the center of curvature of said curved section, a pair of arms fixed to said shaft and spaced apart half the angular extent of said arcuate section, linkage connecting said arms respectively to said bars, means for oscillating said shaft, and pushers on said arms and adapted to extend close to said arcuate section.

7. In a conveying apparatus, two spaced receptacles, straight rail sections over said receptacles, an arcuate section connecting said straight rail sections, pusher bars slidably mounted along said straight sections, pushers extending from said bars toward said straight sections, a shaft rotatably mounted in the center of curvature of said curved section, an arm fixed to said shaft, linkage connecting said arm to one of said bars, a link fixed to said shaft and having approximately the length of said arm, means for oscillating said links, a pusher on said arm and adapted to extend close to said arcuate section, and a connection from said shaft to the other bar.

8. In a conveying apparatus, two spaced receptacles, straight rail sections over said receptacles, an arcuate section connecting said straight rail sections, pusher bars slidably mounted along said straight sections, pushers extending from said bars toward said straight sections, a shaft rotatably mounted in the center of curvature of said curved section, a pair of arms fixed to said shaft, linkage connecting said arms respectively to said bars, a link fixed to said shaft, means for oscillating said link, said arms being spaced apart half the angular extent of said arcuate section and having each approximately the length of said link, and pushers on said arms and adapted to extend close to said arcuate section.

9. A conveying apparatus, two spaced rows of receptacles, an alined series of spaced rail sections fixedly mounted over each row, an arcuate section joining the end sections of said series, a chassis movably mounted over said receptacles, means for moving said chassis up and down over said receptacles, a series of spaced rail sections carried by said chassis and adapted to fit in the spaces between the first named sections in the lower position of the chassis, slidably mounted pusher bars carried by said chassis, pushers carried by said bars in close proximity to the movable rail sections and adapted to engage work on the several rail sections in either position of the chassis, a shaft rotatably mounted in the center of curvature of said curved section, an arm fixed to said shaft, linkage connecting said arm to one of said bars, means for oscillating said shaft, a pusher on said arm and adapted to extend close to said arcuate section, and a connection from said shaft to the other bar.

10. A conveying apparatus, two spaced rows of receptacles, an alined series of spaced rail sections fixedly mounted over each row, an arcuate section joining the end sections of said series, a chassis movably mounted over said receptacles, means for moving said chassis up and down over said receptacles, a series of spaced rail sections carried by said chassis and adapted to fit in the spaces between the first named sections in the lower position of the chassis, slidably mounted pusher bars carried by said chassis, pushers carried by said bars in close proximity to the movable rail sections and adapted to engage work on the several rail sections in either position of the chassis, a shaft rotatably mounted in the center of curvature of said curved section, a pair of arms fixed to said shaft and spaced apart half the angular extent of said arcuate section, linkage connecting said arms respectively to said bars, means for oscillating said shaft, and pushers on said arms and adapted to extend close to said arcuate section.

11. A conveying apparatus, two spaced rows of receptacles, an alined series of spaced rail sections fixedly mounted over each row, an arcuate section joining the end sections of said series, a chassis movably mounted over said receptacles, means for moving said chassis up and down over said receptacles, a series of spaced rail sections carried by said chassis and adapted to fit in the spaces between the first named sections in the lower position of the chassis, slidably mounted pusher bars carried by said chassis, pushers carried by said bars in close proximity to the movable rail sections and adapted to engage work on the several rail sections in either position of the chassis, a shaft rotatably mounted in the center of curvature of said curved section, an arm fixed to said shaft, linkage connecting said arm to one of said bars, a link fixed to said shaft and having approximately the length of said arm, means for oscillating said links, a pusher on said arm and adapted to extend close to said arcuate section, and a connection from said shaft to the other bar.

12. A conveying apparatus, two spaced rows of receptacles, an alined series of spaced rail sections fixedly mounted over each row, an arcuate section joining the end sections of said series, a chassis movably mounted over said receptacles, means for moving said chassis up and down over said receptacles, a series of spaced rail sections carried by said chassis and adapted to fit in the spaces between the first named sections in the lower position of the chassis, slidably mounted pusher bars carried by said chassis, pushers carried by said bars in close proximity to the movable rail sections and adapted to engage work on the several rail sections in either position of the chassis, a shaft rotatably mounted in the center of curvature of said curved section, a pair of arms fixed to said shaft, linkage connecting said arms respectively to said bars, a link fixed to said shaft, means for oscillating said link, said arms being spaced apart half the angular extent of said arcuate section and having each approximately the length of said link, and pushers on said arms and adapted to extend close to said arcuate section.

13. In a conveying apparatus, a series of receptacles, an alined series of spaced rail sections fixedly supported over said receptacles, a chassis movably mounted over said receptacles, means for moving said chassis up and down over said receptacles, a series of spaced rail sections carried by said chassis and adapted to fit in the spaces between the first named sections in the lower position of the chassis, slidably mounted pusher bars carried by said chassis, pushers carried by said bars in close proximity to the movable rail sections and adapted to engage work on the several rail sections in either position of the chassis, and means for reciprocating said bars in both positions of the chassis, said pushers being spaced unequally at various parts of said rail sections.

14. In a conveying apparatus, a series of receptacles, an alined series of spaced rail sections fixedly supported over said receptacles, a chassis movably mounted over said receptacles, means for moving said chassis up and down over said receptacles, a series of spaced rail sections carried by said chassis and adapted to fit in the spaces between the first named sections in the lower position of the chassis, slidably mounted pusher bars carried by said chassis, pushers carried by said bars in close proximity to the movable rail sections and adapted to engage work on the several rail sections in either position of the chassis, and means for reciprocating said bars in both positions of the chassis, said pushers being spaced unequally at various parts of said rail sections, said pushers being adjustable lengthwise on said bars.

15. In a conveying apparatus, a plurality of aligned work treating tanks, a fixed work rail extending over and along said tanks, a slidably mounted pusher bar extending along and movable along said rail, a plurality of pushers spaced along a length of said bar at one of said tanks, another plurality of pushers spaced along another length of said bar at another of said tanks at a spacing unequal to the spacing of the first named pushers, all of said pushers extending toward said rail to engage work thereon, and means for reciprocating said bar in equal strokes slightly greater than the spacing of either of the pluralities of pushers.

16. In a conveying apparatus, as set forth in claim 15, the pushers of the first plurality being spaced equally among themselves, and the pushers of the second plurality being spaced equally among themselves.

JOHN V. DAVIS.

References Cited in the file of this patent
UNITED STATES PATENTS

| Number | Name | Date |
| --- | --- | --- |
| 1,446,594 | Stadler | Feb. 27, 1923 |
| 1,467,409 | Wilkinson | Sept. 11, 1923 |
| 1,736,935 | Navarre | Nov. 26, 1929 |
| 2,112,164 | Kronsbein | Mar. 22, 1938 |
| 2,143,116 | Todd | Jan. 10, 1939 |
| 2,245,673 | Huenerfauth | June 17, 1941 |
| 2,479,322 | Davis | Aug. 16, 1949 |